United States Patent
Liong et al.

(10) Patent No.: US 7,539,741 B2
(45) Date of Patent: May 26, 2009

(54) SYSTEM, APPARATUS AND METHOD FOR SUPPORTING CONSTRAINT BASED ROUTING FOR MULTI-PROTOCOL LABEL SWITCHING TRAFFIC ENGINEERING IN POLICY-BASED MANAGEMENT

(75) Inventors: Yin-Ling Liong, Woburn, MA (US); Roberto Barnes, Espoo (FI); Man Li, Bedford, MA (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/635,205

(22) Filed: Aug. 5, 2003

(65) Prior Publication Data
US 2004/0218535 A1 Nov. 4, 2004

Related U.S. Application Data

(60) Provisional application No. 60/467,066, filed on Apr. 30, 2003.

(51) Int. Cl.
*G06F 15/16* (2006.01)
(52) U.S. Cl. ........................ 709/223; 709/220; 709/228; 370/254; 370/255
(58) Field of Classification Search .................. 709/220, 709/223, 228; 370/254, 255
See application file for complete search history.

(56) References Cited

U.S. PATENT DOCUMENTS 5,832,503 A * 11/1998 Malik et al. ................. 709/223

| 6,167,445 | A | * | 12/2000 | Gai et al. ..................... 709/223 |
| 6,680,943 | B1 | * | 1/2004 | Gibson et al. ................ 370/392 |
| 6,751,729 | B1 | * | 6/2004 | Giniger et al. ............... 713/153 |
| 6,775,280 | B1 | * | 8/2004 | Ma et al. ...................... 370/392 |
| 6,856,676 | B1 | * | 2/2005 | Pirot et al. .............. 379/201.01 |
| 7,184,434 | B2 | * | 2/2007 | Ganti et al. .................. 370/389 |
| 2002/0071389 | A1 | * | 6/2002 | Seo ............................. 370/232 |
| 2002/0091802 | A1 | * | 7/2002 | Paul et al. .................... 709/220 |
| 2002/0110087 | A1 | * | 8/2002 | Zelig et al. .................. 370/236 |

OTHER PUBLICATIONS

Akyildiz, I.F. et al. May 12, 2002. A new traffic engineering manager for DIFFSERV/MPLS networks: design and implementation of an IP QoS Testbed. Computer Communications: 26:388-403.
Bernet, Y. et al. May 2002. "An Informal Management Model for Diffserv Routers." RFC 3290. *IETF.* 50pp.
Faucheur, F.L. et al. May 2002. "Multi-Protocol Label Switching (MPLS) Support of Differentiated Services." RFC 3270. *IETF.* 57pp.

(Continued)

*Primary Examiner*—Jinsong Hu
(74) *Attorney, Agent, or Firm*—Squire, Sanders & Dempsey, LLP

(57) ABSTRACT

A policy server is arranged to construct device-neutral policies for configuring CBR for MPLS traffic engineering across a network. The policy server translates the device-neutral policies into device-specific commands (e.g. link attribute definitions and affinity profiles). The policy server defines the link attributes, assigns the link attributes to network interfaces, establishes affinity profiles and attaches the affinity profiles to MPLS tunnels. The link attribute definitions and affinity profiles are shared across the network to construct the policies such that IP operators can configure CBR easily across a network.

17 Claims, 7 Drawing Sheets

OTHER PUBLICATIONS

Faucheur, F.L. and W. Lai. Jul. 2003. Requirements For Support of Differentiated-Services-aware MPLS Traffic Engineering. Draft-ietf-tewg-diff-te-reqts-07.txt. *IETF*. 2pp.

Flegkas, P. et al. Mar.-Apr. 2002. "A Policy-Based Quality of Service Management System for IP Diffserv Networks." *IEEE Network Magazine*:50-56.

Jacobson, V. et al. Jun. 1999. "an Expedited Forwarding PHB." RFC2598. *IETF*. 10pp.

Katz, D. et al. Oct. 2002. Traffic Engineering Extensions to OSPF Version 2. Draft-katz-yeung-ospf-traffic-09.txt. *IETF*. 14pp.

Toni Li and Smit, Henk. Aug. 2001. "IS-IS Extensions for Traffic Engineering." Draft-ietf-isis traffic.04.txt. *IETF* Internet Draft. 22pp.

Trimintzios, P. et al. May 2001 A Management and Control Architecture for Providing IP Differentiated Services in MPLS-based Network. *IEEE Commun. Mag. Special Issue: IP Operations and Management*. 39:5:80-88.

Westerinen, A. et al. Nov. 2001. Terminology for Policy-Based Management. RFC 3198. 19pp.

Le Faucheur, Francois, Ed. Mar. 2004. Protocol extensions for support of Differentiated-Service-aware MPLS Traffic Engineering. TEWG Internet Draft. 32pp.

\* cited by examiner

SYSTEM, APPARATUS AND METHOD FOR SUPPORTING CONSTRAINT BASED ROUTING FOR MULTI-PROTOCOL LABEL SWITCHING TRAFFIC ENGINEERING IN POLICY-BASED MANAGEMENT

RELATED APPLICATION

This utility application claims benefit under 35 United States Code § 119(e) of U.S. Provisional Application No. 60/467,066 filed on Apr. 30, 2003.

FIELD OF THE INVENTION

This invention relates to data packet routing, and in particular, to policy management for configuring constraint based routing in multi-protocol label switching traffic engineering.

BACKGROUND OF THE INVENTION

Packet-forwarding policies are in place to administer, manage and control access to network resources. Policy-based management employs a policy server to manage the network as a whole. The policy server translates business goals or policies into configurations of network resources and automates the configurations across multiple different network elements and different technologies (e.g. MPLS and Diffserv). The centralized approach ensures policy consistency across multiple network elements.

Multi-protocol label switching (MPLS) is a packet-forwarding technology that gives internet protocol (IP) operators a high degree of control over the paths taken by packets on their networks. MPLS may be used for traffic engineering purposes. Interior gateway protocols (IGP), such as open shortest path first (OSPF) and intra-domain intermediate system to intermediate system routing protocol (IS-IS), route IP packets based only on the destination address and the shortest path to reach the destination. In contrast, MPLS traffic engineering allows administrators to establish routes for certain customers based on information other than the shortest path, such as delay and bandwidth available along the path. Therefore, MPLS can relieve congestion and maximize bandwidth utilization by allowing multiple paths between source and destination.

Constraint based routing (CBR) is an example of MPLS traffic engineering. The operator does not specify the path explicitly but depends on a CBR mechanism that has been implemented in the network to determine the path. With CBR, every router advertises traffic-engineering attributes (e.g., maximum bandwidth, unreserved bandwidth, etc.) for its interfaces to all other routers. OSPF and IS-IS protocols have been extended for that purpose. As a result of the advertisement, every router obtains a traffic-engineering database in addition to the regular routing database. When a label switch path (LSP) with QoS requirements needs to be established, the ingress router computes the optimal path based on the traffic-engineering database and a path selection algorithm. The router then signals the path establishment with a label distribution protocol. The explicit path selected is conveyed through the signaling protocol.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to a system for configuring constraint based routing (CBR) in multi-protocol label switching (MPLS) traffic-engineering with a policy-based management approach across a network. The system includes network interfaces where link attribute definitions are set, affinity profiles that relate to preferred link attributes, and policy server. The policy server attaches the affinity profiles to a MPLS tunnel such that the affinity profiles are shared across the network to construct service and network policies.

Another aspect of the present invention is directed to an apparatus for configuring CBR in MPLS traffic engineering with a policy-based management approach across a network. The apparatus includes a service application, a central processing facility and a policy consumer. The service application configures policies.

The central processing facility translates the policies into device-neutral policy parameters. The policy consumer translates the device-neutral policies into device-specific commands and deploys the device-specific commands to policy targets, such that the policies are constructed across the network.

Another aspect of the present invention is directed to a method for supporting CBR for MPLS traffic engineering across a network. The method includes: defining link attributes; assigning the link attributes to network interfaces; establishing affinity profiles that specify preferred traffic engineering attributes; and attaching the affinity profiles to MPLS tunnels such that service and network policies are constructed across the network.

Another aspect of the present invention is directed to an apparatus for configuring CBR in MPLS traffic engineering with a policy-based management approach across a network. The apparatus comprises: a means for defining link attributes; a means for assigning the link attributes to network interfaces; a means for establishing affinity profiles that specify preferred traffic engineering attributes; and a means for attaching the affinity profiles to MPLS tunnels such that service and network policies are constructed across the network.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Briefly stated, a policy server is arranged to construct device-neutral policies for configuring constraint based routing (CBR) for multi-protocol label switching (MPLS) traffic engineering across a network. The policy server translates the device neutral policies into device-specific commands. The policy server defines link attributes, assigns the link attributes to network interfaces, establishes affinity profiles and attaches the affinity profiles to MPLS tunnels. The link attribute definitions and the affinity profiles are shared across the network to construct the policies such that IP operators can configure CBR easily across a network.

Figure 1:
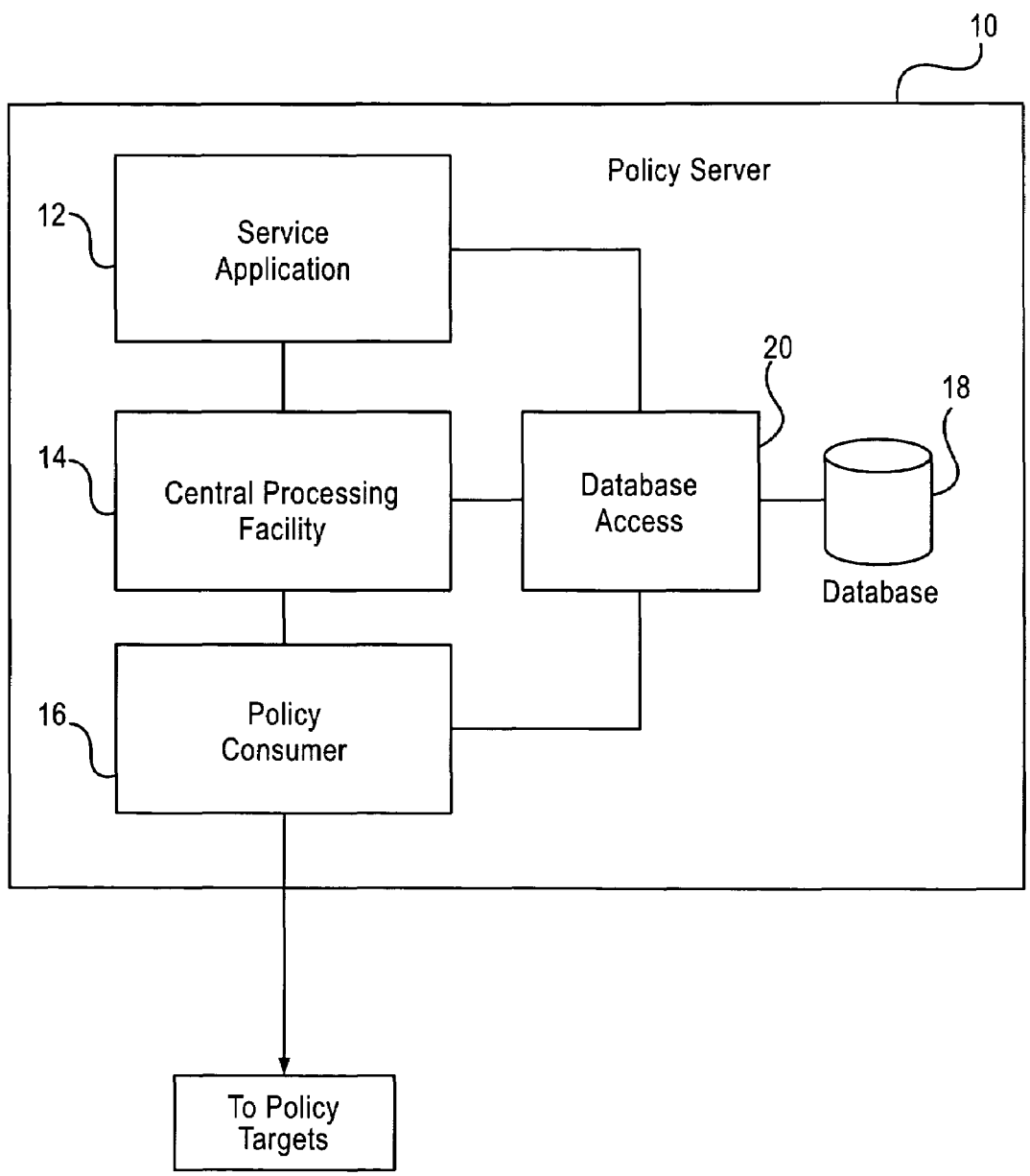
FIG. 1 is a block diagram illustrating the architecture of a policy server.

FIG. 1 illustrates a block diagram of the architecture of a policy server that supports differentiated services (Diffserv) over MPLS traffic engineering. Policy server 10 includes service application 12, central processing facility 14, and policy consumer 16 all coupled to database 18 through database access 20 which provides interfaces for database 18 read and write operations.

Service application 12 is a graphical user interface (GUI) that allows IP operators to configure policies (i.e., operators can add, delete or modify policies.) Central processing facility 14 translates the policies into device-neutral policy parameters and stores the policy parameters in database 18. Central processing facility 14 also conducts policy verification, conflict detection and resolution. Policy consumer 16 provides an interface for central processing facility 14 to communicate with policy targets. A policy target refers to any network node where the policy is enforced such as a router. Policy consumer 16 translates the device-neutral policies stored in database 18 into device-specific commands, and deploys the device-specific commands to the policy targets.

According to one embodiment, service policies and network policies are used. Service policies refer to rules that govern the treatment of individual customer traffic, such as traffic classification, metering and marking. Network policies refer to rules that govern the treatment of aggregated traffic, such as queue and scheduler configurations for behavior aggregates. For example, an IP operator may modify service policies when a new service level agreement (SLA) is created or when an existing SLA is modified. An IP operator may modify network policies when new facilities are added into a network or when traffic patterns are changed significantly. In a large network, the same set of policies can be applied to multiple routers or network interfaces. To achieve better scalability, network interfaces are assigned role names and the policies are specified and associated with the roles name. Network interfaces identified by the same role names receive the same set of policies.

A common information model describes policies as relationships between network objects. The information model derives database schema for database 18 such that the policy stored in database 18 is device-neutral. In a multi-vendor environment where routers from different vendors are configured through different protocols, policy server 10 translates the policy stored in database 18 into device-specific commands and delivers the resulting policy through the specific protocol. The information model enables a consistent provision of policies across multi-vendor networks.

Figure 2:
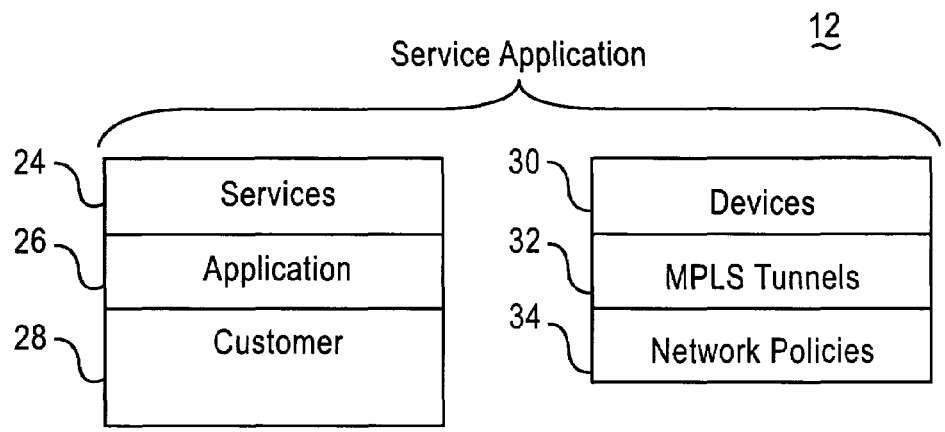
FIG. 2 is a block diagram illustrating the architecture of a service application.

FIG. 2 illustrates a block diagram of the architecture of service application 12. Service application 12 includes services object 24, application object 26, customer object 28, devices object 30, MPLS tunnels object 32 and network policies object 34. Services object 24, applications object 26, and customer object 28 are related to service policies. Devices object 30, MPLS tunnels object 32, and network policies object 34 are related to network policies.

Services object 24 allows IP operators to define the services to be provided to customers. According to one embodiment, each service is defined as a mapping between a service name and any of the fourteen DSCP numbers defined by the Internet Engineering Task Force (IETF). Application object 26 allows IP operators to define applications for the classification of traffic flows such as protocol, source port and destination port ranges. Customer object 28 allows IP operators to define service policies for each customer. Customer object 28 may also contain host groups and metering profiles associated with each customer. Devices object 30 contains information about network elements that receive the policies from policy server 10. IP operators use devices object 30 to assign role names to the network interfaces. Most other policy target information in devices object 30 is directly imported into database 18 from an element management database. MPLS tunnels object 32 allows IP operators to configure the MPLS network components such as tunnel group, explicit routes, CBR and EXP-PHB mapping, i.e., MPLS tunnels object 32 specifies the MPLS and Diffserv/MPLS policies. Network policies object 34 allows IP operators to define the network policies that specify the queuing and scheduling treatment of a specific service and that are attached to specific network interfaces.

Figure 3:
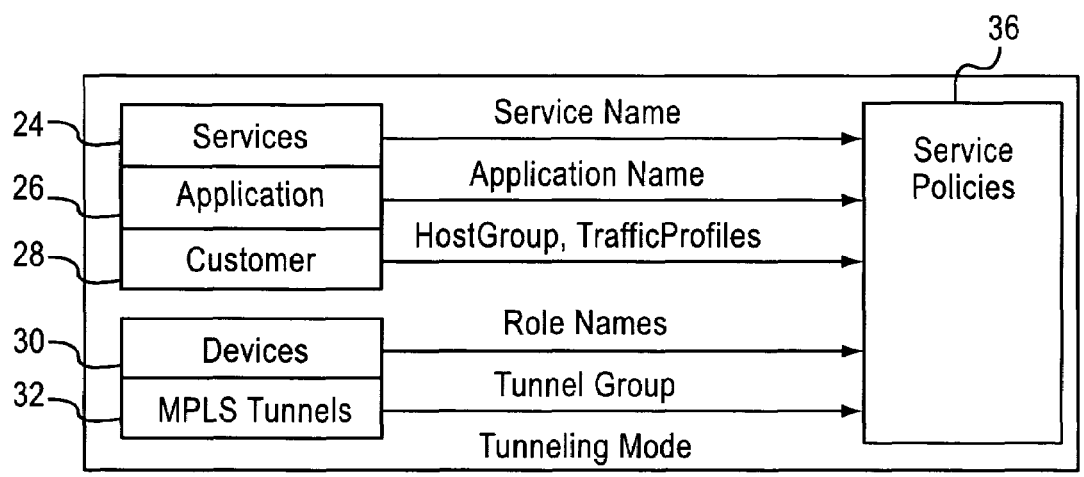
FIG. 3 is a block diagram illustrating the interaction of a service policies object with the service application.

FIG. 3 illustrates a block diagram of the interaction between a service policies object and service application 12. Service policies object 36 includes rules that govern the treatment of individual customer traffic such as classification and metering rules. The classification rules include an application name supplied by application object 26 and source/destination host groups supplied by customer object 28. The metering rules use an algorithm specified by traffic profiles which are supplied to service policies object 36 by customer object 28. Devices object 30 provides role names to service policies object 36 such that service policies object 36 can be applied to the network interfaces. MPLS tunnels object 32 provides information about tunnel group and tunneling mode to service policies object 36. Service policies object 36 defines non-conformance action (e.g., marking or dropping) after metering, and maps the traffic into the desired MPLS tunnels and tunneling mode.

Figure 4:
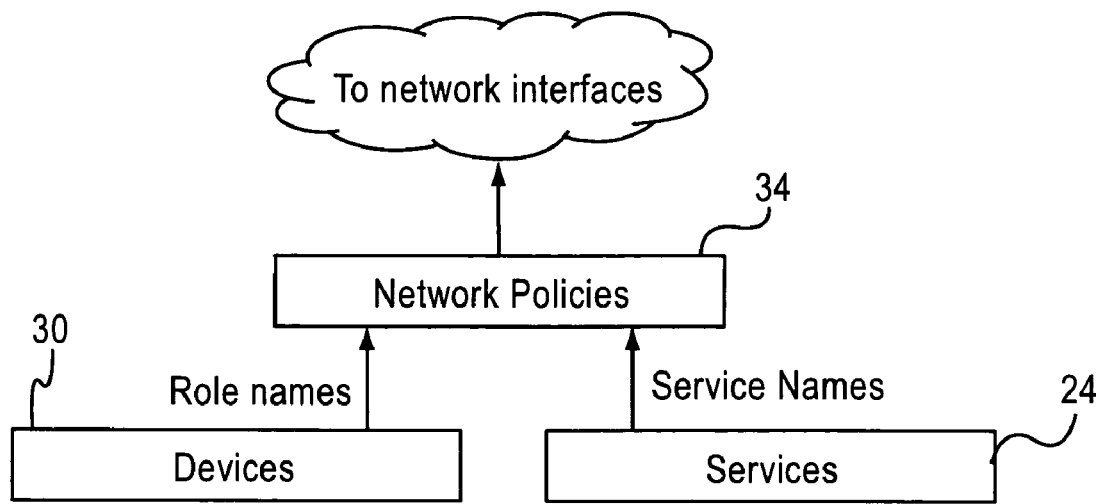
FIG. 4 is a block diagram illustrating the structure of a network policies object.

FIG. 4 illustrates a block diagram of the structure of the network policies object. Devices object 30 allows operators to assign role names to the network interfaces. Network policies object 34 specifies the Diffserv configuration and applies the configuration to the role names. Network policies object 34 then deploys the network policies to the network interfaces through the associated role names.

Services object 24 provides service names to network policies object 34. The service name selects the Diffserv class that supports classified traffic. Network policies object 34 defines the PHB used to support a particular service or Diffserv class, such as queuing and scheduling. In each network interface, all LSPs share the same queue if they have the same PSC, and no per-LSP queuing is employed.

Figure 5:
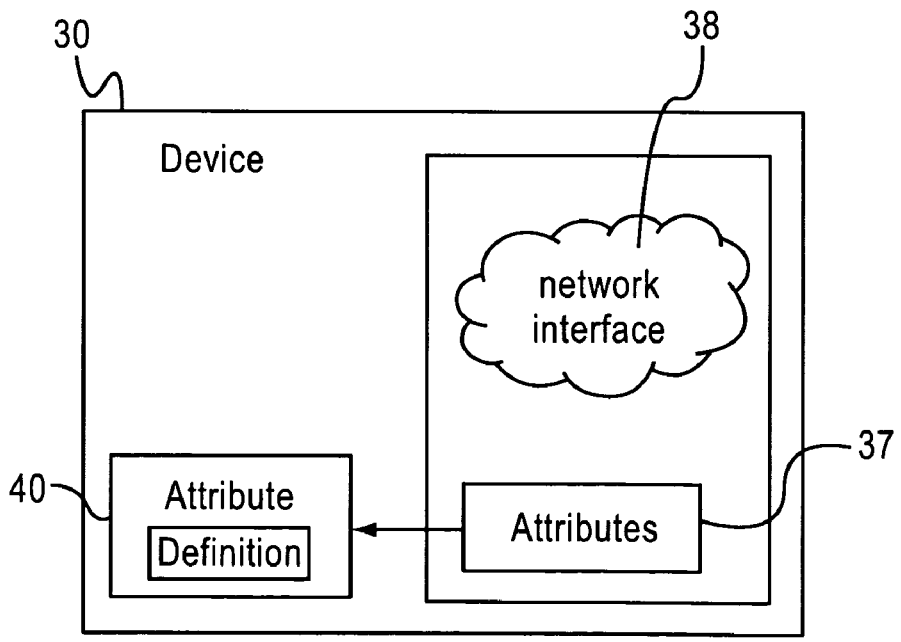
FIG. 5 is a block diagram illustrating the policy elements of a device object.

FIG. 5 illustrates a block diagram of the policy elements of the device object. The policy elements set link attributes 37 in each network interface 38. Policy server 10 defines the semantics of link attributes 37 and affinity profiles supported by link attribute definititon object 40. Link attribute definition object 40 allows IP operators to define a high-level representation for each affinity bit, such as the specific data rate, link technology or virtual private network (VPN) membership. In one embodiment, each representation consists of a bit position, attribute names and a category. In another embodiment, each representation consists of a bit position and an attribute name. An example of an attribute name is "Ethernet" and an example of a category is "Link Technology". Link attributes 37 are then stored in database 18 and shared across different objects. For instance, link attributes 37 can be added to each network interface. Thus, IP operators can select the correct link attributes to describe the network interface.

Figure 6:
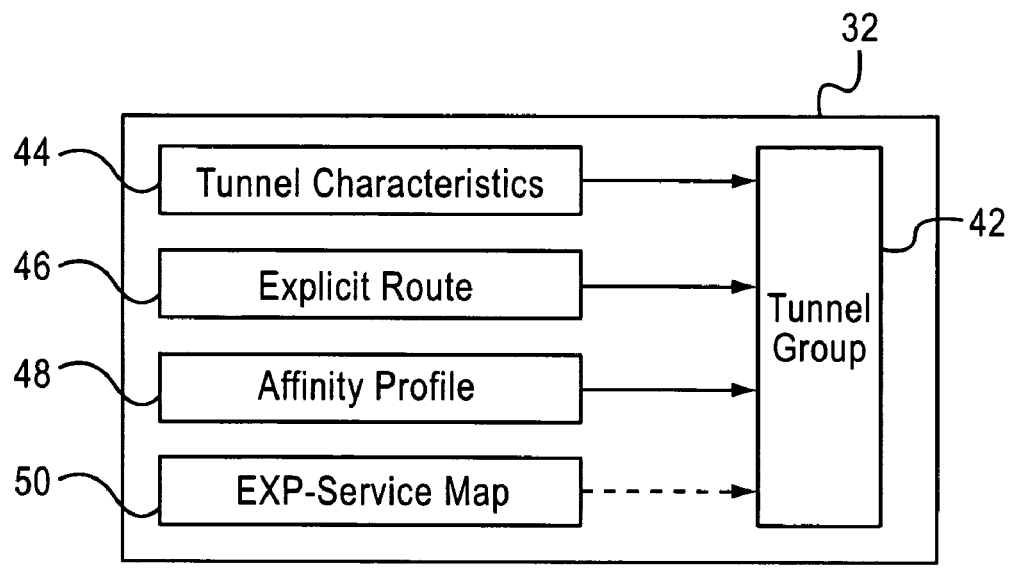
FIG. 6 is a block diagram illustrating the policy elements of a MPLS tunnels object.

FIG. 6 illustrates a block diagram of the policy elements of the MPLS tunnels object. The policy elements include tunnel group 42, tunnel characteristics object 44, explicit route object 46, affinity profile object 48, and EXP-service map 50. Tunnel group 42 is a set of tunnels that share the same properties and form a certain topology, such as a mesh or a star. Tunnel group 42 configures (i.e., creates, maintains and deletes) MPLS tunnels such that IFP operators do not need to create tunnels individually. Instead, IP operators specify the end-point routers and the inter-connecting topology. The internal routes traversed by a tunnel are determined by the underlying routing protocols, such as OSPF or IS-IS. In the case of star topology, the hub and the spokes ate specified explicitly.

Tunnel characteristics object 44 includes profiles that specify the parameters for resource reservation and policing per MPLS tunnel. Explicit route object 46 allows IP operators to explicitly specify the optimal path for forwarding packets. Explicit route object 46 contains a list of interface links that an explicit route LSP traverses through. The list of IP addresses can be a partial or complete route. There can be more than one explicit route list and thus a pointer is necessary to link the list to tunnel group 42. In addition, each explicit route LSP is unidirectional. Therefore, a bidirectional LSP requires configuration of two explicit route LSPs in opposite directions.

There are two steps in configuring tunnel group 42 using CBR: setting the link attributes and attaching affinity profile object 48 to tunnel group 42. Affinity profile object 48 defines affinity profiles that select the preferred link attributes in routing. An affinity profile indicates whether each attribute defined in link attribute definition object 40 is preferred, not preferred, or "don't care." An affinity profile is linked explicitly to a tunnel group. Central processing facility 14 then converts the affinity profile into device neutral information for storage in database 18, which is then used with an extended IGP protocol to support CBR.

The linking of tunnel group 42 in service policies object 36 identifies the LSPs that carry customer traffic. Tunneling mode decides which Diffserv code point (DSCP) is carried in the IP headers when a packet exits the MPLS network. There are two essential modes of tunneling: pipe mode and uniform mode. For pipe mode, the egress router keeps the DSCP of the encapsulated IP header. For uniform mode, the egress router overwrites the original DSCP with the Diffserv information in the MPLS network. Tunnel group 42 and tunneling mode are used if operators use MPLS to carry customer traffic. If MPLS is not used, tunnel group 42 and tunneling mode can be left empty.

Figure 7:
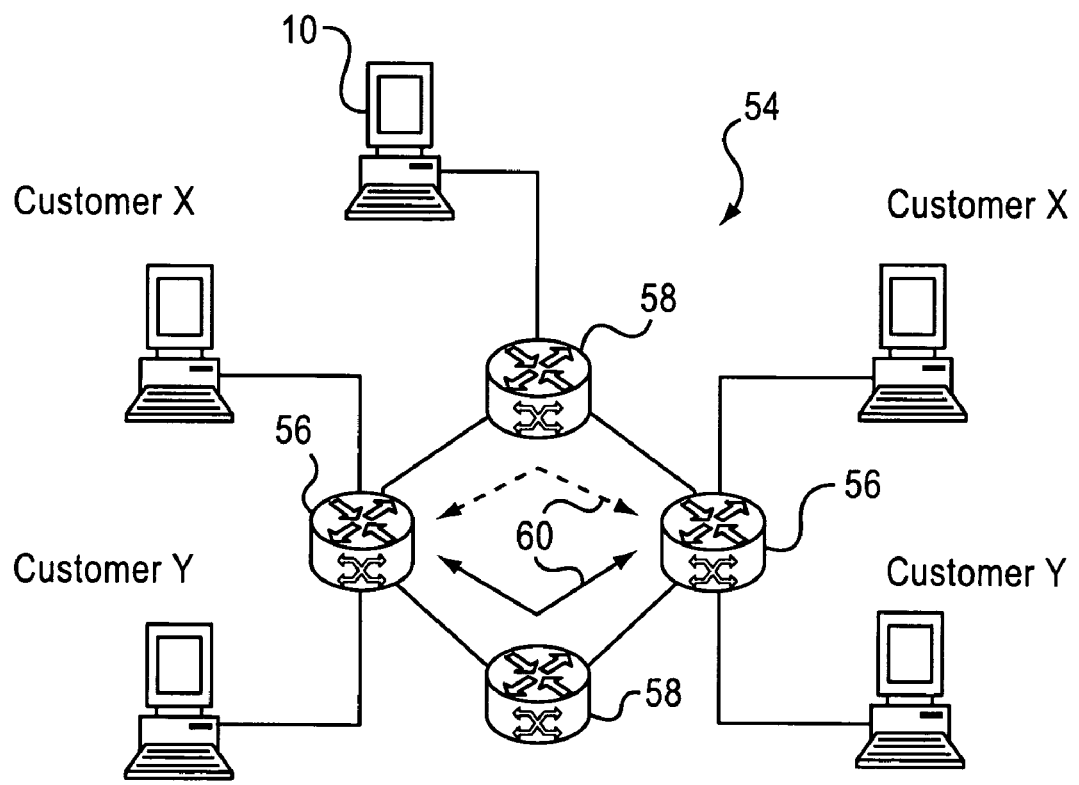
FIG. 7 is a diagram illustrating a network implementing the policy server of the present invention.

FIG. 7 illustrates a diagram of a network implementing the policy server according to aspects of the invention. Network 54 includes two edge routers 56 and two core routers 58. Policy server 10 can construct multiple LSPs between edge routers 56 through explicit route or CBR, as indicated by arrows 60. Policy server 10 can also map customer X and, customer Y into one LSP or split them into two LSPs by service policies. In addition, policy server 10 can assign different customer applications into different Diffserv classes by service policies, and allocate the resources accordingly by network policies.

Figure 8:
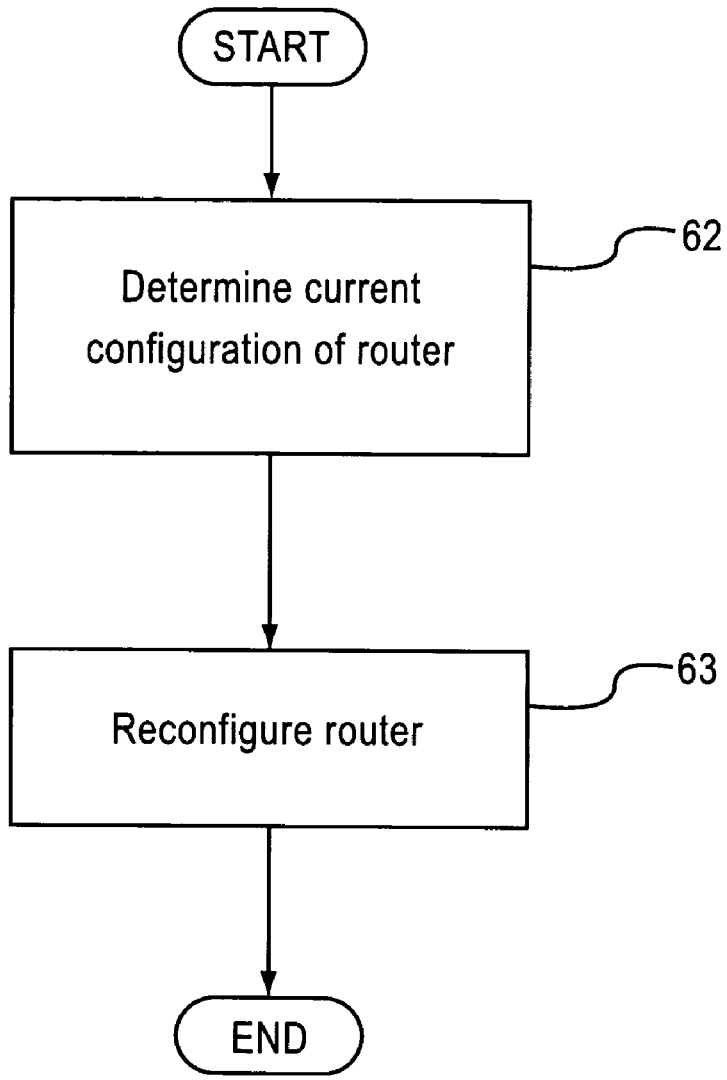
FIG. 8 is a flow diagram illustrating a method for configuring link attributes and affinity profiles to support CBR for MPLS traffic engineering.

According to embodiments of the invention, two approaches for policy deployment onto routers 56, 58 can be implemented. The first approach is generating a new configuration file to replace the file currently in use by the router. FIG. 8 illustrates a flow diagram of the second approach. The current configuration of a router is determined at block 62. The configuration includes information about access lists, classification rules, policies, MPLS tunnels, and the like. The router is reconfigured at block 63. The router is reconfigured by deleting unwanted policies and replacing the unwanted policies with new command line interface (CLI) commands based on the current set of policies to be deployed.

Figure 9:
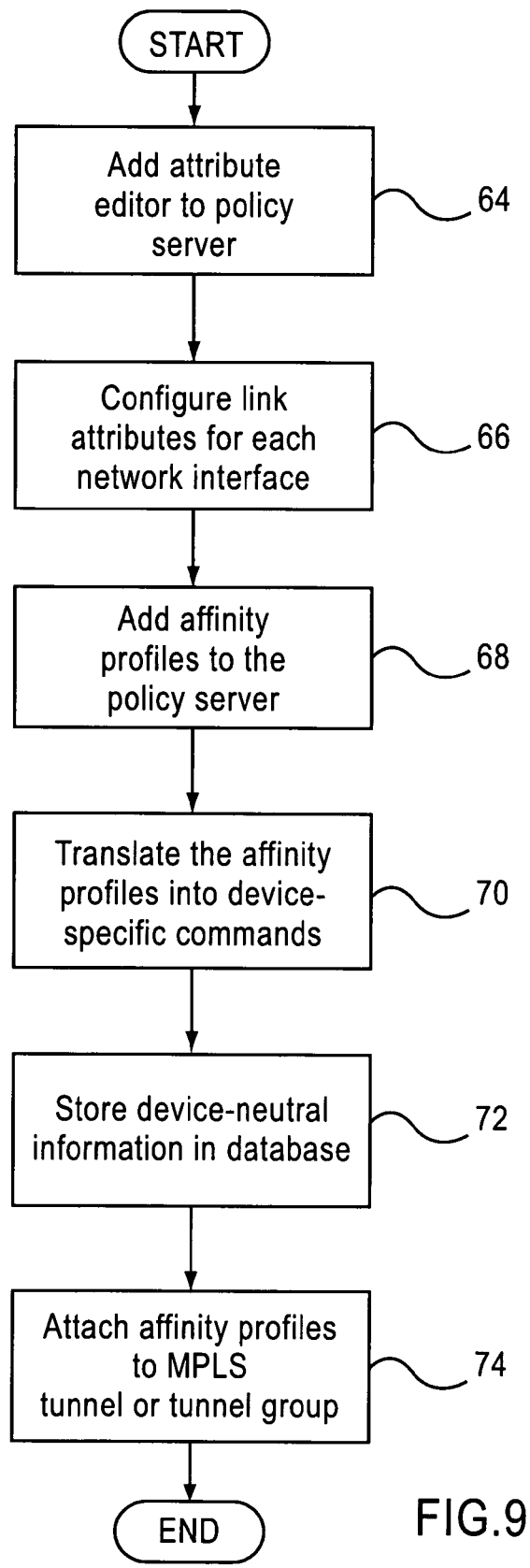
FIG. 9 is a flow diagram illustrating a method for deploying a policy to policy targets.

FIG. 9 illustrates a flow diagram of a method implemented in the policy server for configuring link attributes and affinity profiles according to aspects of the invention. An attribute editor is added to the policy server at block 64. The attribute editor allows operators to define and edit the meaning of attributes supported across the network. Examples of the definition can be related to geography, link speed, VPN group membership, and the like.

The link attributes defined in the attribute editor are configured for each network interface at block 66. Any change in the attribute editor is automatically reflected in the network interface configuration. The GUI for network interfaces displays the attribute names defined in the attribute editor thus allowing IP operators to select the link attributes that describe the characteristics of any network interface. Each interface can have different link attribute settings. Thus, the attribute editor hides the device-specific details for supporting link attributes and allows IP operators to configure the link attributes easily.

Affinity profiles are added to the policy server at block 68. Each affinity profile specifies which link attributes are preferred, which attributes are not preferred and which attributes are "don't care" values. Any modification in the attribute editor is automatically reflected in the affinity profiles. IP operators can configure (i.e., create, delete and edit) the affinity profiles. The policy server translates each affinity profile into device-specific commands at block 70. The policy server stores device-neutral information associated with each affinity profile in the policy server database at block 72.

An affinity profile is attached to an MPLS tunnel or tunnel group by the policy server at block 74. A tunnel group refers to an identifier that represents a collection of MPLS tunnels that share the same properties and are connected by a certain topology. A tunnel group provides a mechanism to attach an affinity profile to multiple tunnels. An extended interior gateway protocol (IGP) supports MPLS traffic engineering and selects the optimal path based on affinity profiles and advertised link attributes. The affinity profiles are shared across the network. Thus, two different tunnel groups or MPLS tunnels can reuse the same affinity profile. The policy server uses the affinity profile in constructing the device-specific commands to establish the MPLS tunnels.

Figure 10:
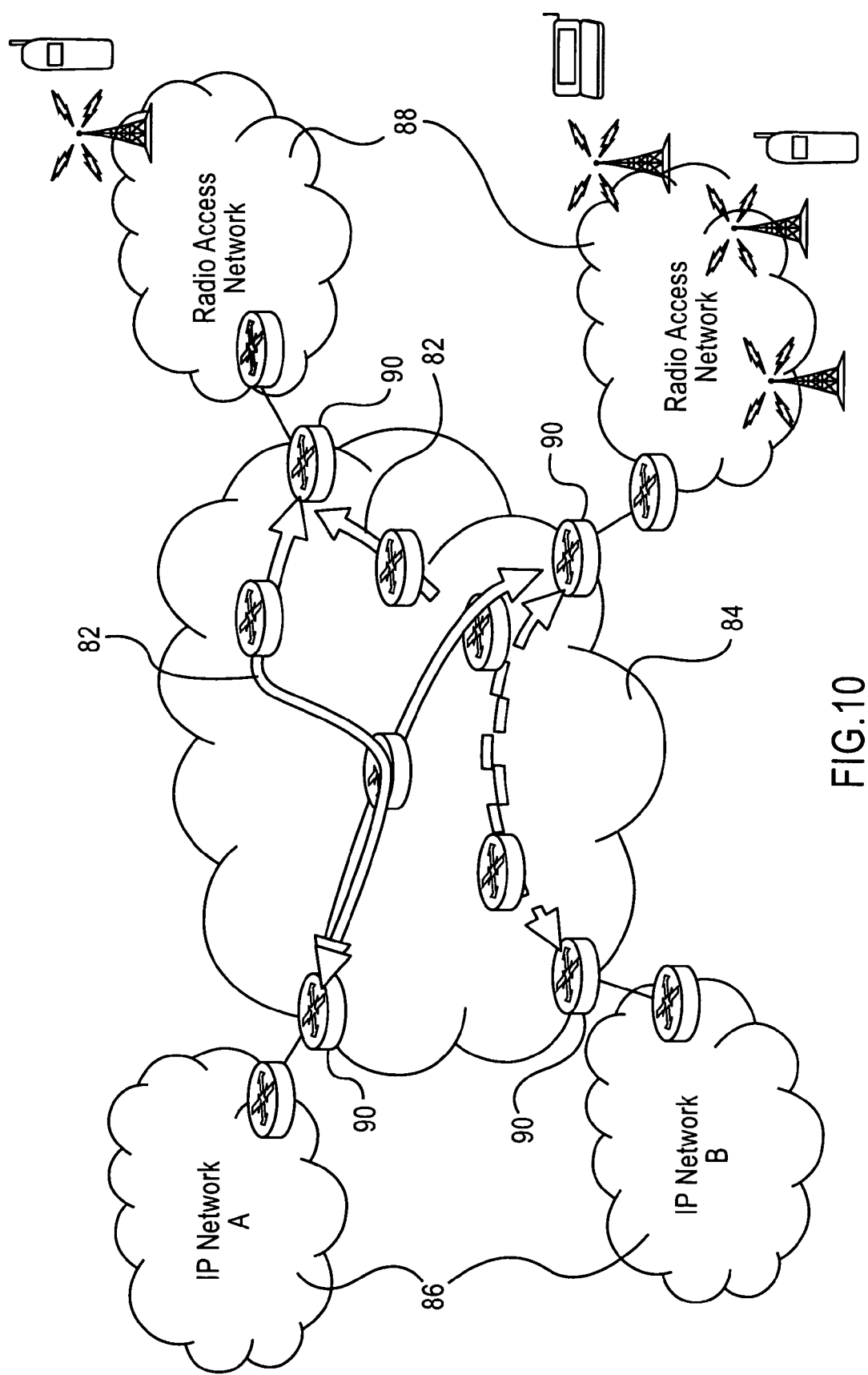
FIG. 10 is a block diagram illustrating the method implemented in a 3 G network, in accordance with aspects of the invention.

The above-described methods can be implemented in an existing MPLS policy server to support CBR for MPLS traffic engineering. FIG. 10 illustrates an example of the methods implemented in third generation (3 G) networks. MPLS tunnels 82 are established across an IP transport network 84, which include public land mobile networks (PLMN), to provide VPN support. MPLS tunnels 82 provide pathways between IP networks 86 and radio access networks 88. The method provides IP operators with a unified management tool that can configure serving edge routers 90 to support CBR. According to one embodiment, edge routers 90 include general packet radio service (GPRS) support nodes (SGSN), gateway GPRS support nodes (GGSNs) and third party MPLS routers.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A system for configuring constraint based routing in multi protocol label switching traffic engineering with a policy based management approach across a network, comprising:
   network interfaces configured to have link attribute definitions set;
   a memory configured to store affinity profiles configured to identify at least one link attribute as preferred or not preferred;
   a policy server configured to attach the affinity profiles to a multi-protocol label switching tunnel such that the affinity profiles and the link attribute definitions are shared across a network to construct service and network policies; and
   a link attribute definition object that is configured to define the semantics of the link attributes and the affinity profiles,
   wherein the link attribute definition object is further configured to describe a policy target by defining a representation for each attribute bit and for each affinity bit in the affinity profile.

2. The system of claim 1, wherein the affinity profiles are device-neutral and wherein the policy server is further configured to translate the affinity profiles into device-specific commands.

3. The system of claim 1, wherein the policy server is further configured to assign the link attributes to the network interfaces by determining the current configuration of a muter, configuring the router, and issuing new commands based on the set of link attributes to be assigned.

4. The system of claim 1, wherein the policy server comprises a user interface that is configured to allow an operator to configure the service and network policies.

5. The system of claim 1, wherein the policy server is further configured to configure the multi-protocol label switching tunnels such that an operator can create an multi-protocol label switching tunnel by specifying end-point routers and inter-connecting topology.

6. The system of claim 1, further comprising a database configured for storing the affinity profiles, the link attribute definitions and the link attributes of each of the network interfaces.

7. The system of claim 1, wherein the representation comprises at least one of a bit position, an attribute name and category.

8. The system of claim 1, wherein the affinity profiles identify at least one link attribute as preferred and at least one link attribute as not preferred.

9. The system of claim 1, wherein the affinity profiles identify each link attribute as preferred, not preferred, or neutral.

10. A method for supporting constrain based routine for multi-protocol label switching traffic engineering across a network, comprising:
    performing, by a computer processor defining link attributes;
    assigning the link attributes to network interfaces;
    establishing affinity profiles that identify at least one traffic engineering attribute as preferred or not preferred;
    attaching the affinity profiles to multi-protocol label switching tunnels such that service and network policies are constructed across a network;
    defining the semantics of the link attributes and the affinity profiles, and
    defining a representation for each attribute bit and for each affinity bit in the affinity profile.

11. The method of claim 10, further comprising storing the affinity profiles, the link attribute definitions and the link attributes of each of said network interfaces in a database.

12. The method of claim 10, further comprising translating the amity profiles into device-specific commands.

13. The method of claim 10, further comprising storing device-neutral information associated with the affinity profiles in a database.

14. The method of claim 10, wherein assigning the link attributes to the network interfaces further comprises:
    determining the command configuration of a router; configuring the router; and
    issuing new commands to the router based on the link attributes to be assigned.

15. An apparatus for configuring constraint based routing in multi protocol label switching traffic engineering with a policy based management approach across a network, comprising:
    a computer processor configured to
        define link attributes; a an ass~ming means for assigning the link attributes to network interfaces;
        establish affinity profiles that identify at least one traffic engineering attribute as preferred or not preferred; and
        define the semantics of the link attributes and the affinity profiles; and
        describe a policy target by defining a representation for each attribute bit and for each affinity bit in the affinity profile.

16. The apparatus of claim 15, wherein the processor is further configured to the affinity profiles into device-specific command.

17. A computer-readable storage medium encoded with a computer program configured to control a processor to perform:
    defining link attributes;
    assigning the link attributes to network interfaces;
    establishing affinity profiles that identify at least one traffic engineering attribute as preferred or not preferred; and
    attaching the affinity profiles to multi-protocol label switching tunnels such that service and network policies are constructed across a network;
    defining the semantics of the link attributes and the affinity profiles, and
    defining a representation for each attribute bit and for each affinity bit in the affinity profile.

* * * * *